DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 23

T881,012
SILVER DYE BLEACH PROCESS USING CHELATED DYES

John Williams and Robert T. Claunch, Pittsford, N.Y.
(both of 1669 Lake Ave., Rochester, N.Y. 14650)

Filed June 11, 1970, Ser. No. 45,461
Int. Cl. G03c *1/76*
U.S. Cl. 96—73
1 Sheet Drawing. 29 Pages Specification

A photographic silver-dye-bleach element of improved speed contains in one or more emulsion layers an azo dye which during image exposure absorbs radiation of different wavelength from that of the sensitizing dye of the particular emulsion. In this way the speed loss inherent in conventional silver-dye-bleach products which contain dyes that adsorb light in the same range as the emulsion, is avoided. These azo dyes form a metal complex, e.g., a chelate, of different hue from that of the non-metallized dye and bleach in the presence of developed silver. Therefore, after exposure the dyes are complexed with a metal such as Co, Ni, Cu, Cr or Pb during or after black and white processing to yield a dye which is complementary in color to the sensitivity of its emulsion layer. The metal complexes also provide improved dye stability and extinction. The resultant image is positive, as the dye and silver associated with the image are destroyed in a bleach bath. Examples of suitable azo dyes include: 8-acetamido-1-hydroxy-2-(8 - quinolylazo)-5,7-naphthalene disulfonic acid disodium salt; 8-amino-2-(4-benzotriazolylazo)-1-hydroxy-5,7-naphthalene disulfonic acid disodium salt; and 1-hydroxy-4-(8 - quinolyl)-2-[4 - (2,4 - di-tert-amylphenoxy)-n-butyl]naphthamide.

SILVER DYE BLEACH PROCESS USING CHELATED DYES
Filed June 11, 1970
FIG. 1 ELEMENT DURING EXPOSUAE
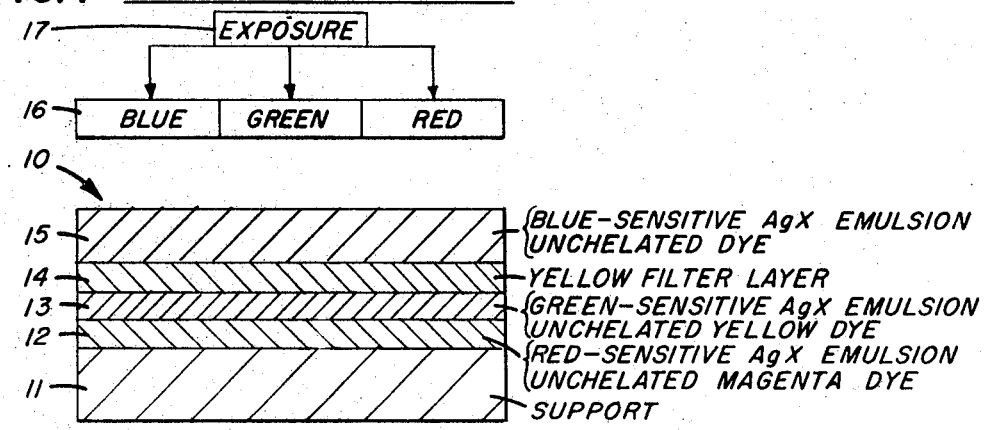
FIG. 2
ELEMENT AFTER PROCESSING
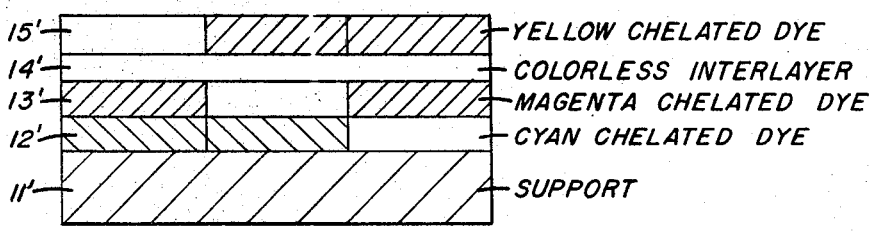
FIG. 3
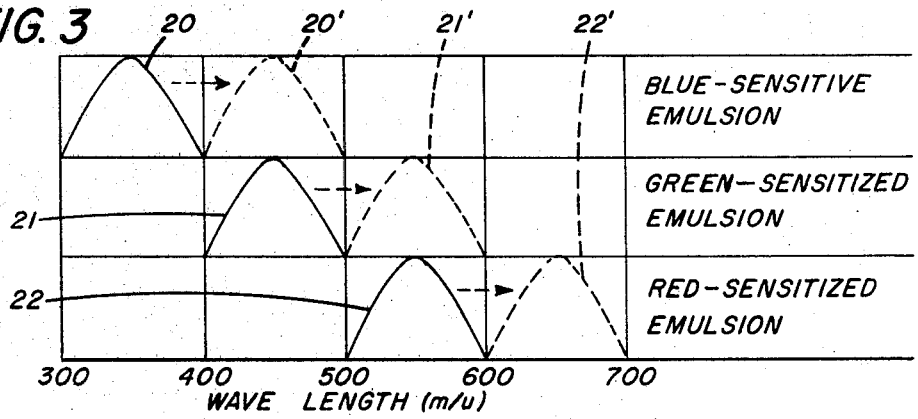
JOHN WILLIAMS
ROBERT T. CLAUNCH
INVENTORS
BY Dennis M. DeLeo
ATTORNEY